Patented Nov. 5, 1935

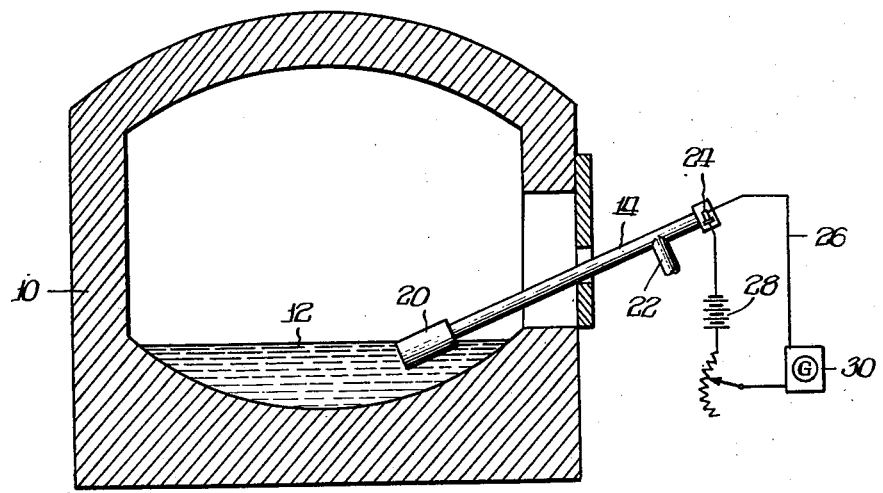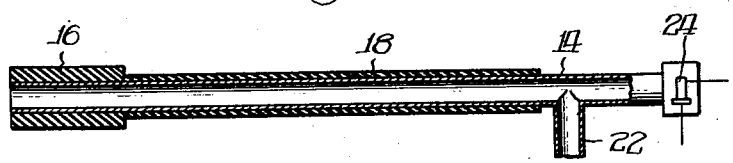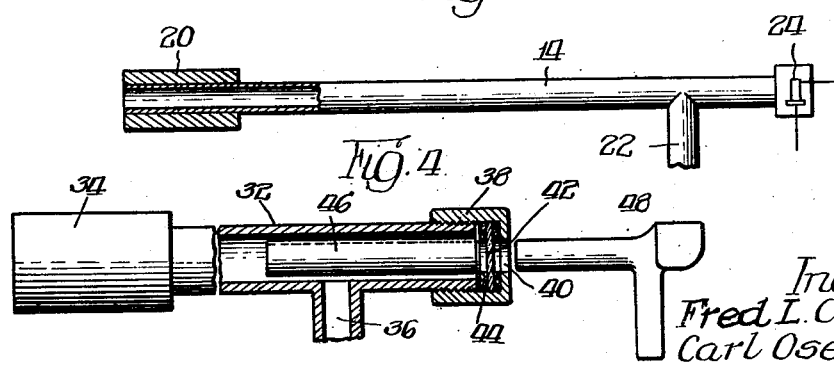

2,020,019

UNITED STATES PATENT OFFICE 2,020,019

APPARATUS FOR MEASURING HIGH TEMPERATURES

Fred L. Collins and Carl Oseland, Gary, Ind.

Application May 18, 1934, Serial No. 726,421

8 Claims. (Cl. 73—32)

The invention relates to apparatus for measuring high temperatures, particularly temperatures of a metal bath such as occurs in an open hearth or similar furnace in the process of refining the charge.

It has long been realized that the temperature of the metal bath during the working of the heat has an important bearing upon the quality of the finished steel, as it affects the final chemical analysis, the mechanical structure and the losses in the finished product. Many ways have been tried to obtain readings of temperature of the metal bath during the melting and shaping of the heat but with little success, due to the blanket of slag over the bath. It has been necessary to go by observation and experience of the melter and to make certain checks found necessary while the steel is being tapped from the furnace into the ladle. This check of course is too late to make it possible for the melter to make use of the information during the working of the heat.

The invention has for its object to provide apparatus for measuring the temperature of molten metals which contemplates the use of a light, heat, brightness or color sensitive medium electrically connected with a recording instrument, or used with an optical instrument for indicating the intensity of the light emanating from the body of molten metal.

A further object is to provide a device for measuring high temperatures which will be simple in construction, accurate in use and which will not require expensive refractory material for protection.

Another object is to provide apparatus of the character described which will require only a few seconds to record the temperature of the metal bath and which will otherwise operate in an improved manner.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a vertical cross section through the body of an open hearth furnace showing the application of the invention thereto for measuring the temperature of the metal bath;

Figure 2 is a sectional view taken longitudinally through the device showing the use of insulation to protect the same from the high temperatures;

Figure 3 is an elevational view, parts being taken in section, showing the apparatus provided with different insulating means; and Figure 4 is a sectional view of a modified form of apparatus for use with an optical instrument.

The invention consists of a specially designed tube for introduction through the roof or door of a furnace such as the open hearth furnace 10, Figure 1, until the same extends below the surface of the molten iron 12 within the furnace. The tube in passing through the slag covering the top of the metal bath becomes coated with the same, which provides an effective insulating covering for the lower end of the tube to protect the same during the short period it is in the bath. This slag coating is advantageous but not absolutely necessary to the successful operation of the apparatus since the same is protected against the high temperature of the molten metal by other means. The recording of the temperature of the metal bath takes place during the time the lower end of the tube remains immersed in the metal, which requires several seconds, whereupon the same is withdrawn and allowed to cool down before another operation.

Referring more particularly to Figures 1 and 2 the tube 14 comprises a steel pipe approximately one and one-half inches to two inches in diameter and of a length so that several feet will project outside of the furnace when the lower end is immersed in the metal bath. The lower end of the tube is insulated by means of a heavy metal section 16 having a secure fit on the tube. This protects the end against corrosion due to the high temperature of the molten metal. The remaining surface of the tube, which is also subjected to the high temperatures within the furnace, is protected by means of a sleeve 18 of any suitable insulating material. In Figure 3 a somewhat modified construction is disclosed in which the insulating sleeve is omitted and the metal end section is replaced by a section 20 of refractory material.

The portion of the tube extending to the outside of the furnace connects with a pipe or conduit 22 which supplies air under pressure to the tube 14. As the end adjacent to said source of supply is closed by a light sensitive element 24, such as a selenium cell, the air is discharged from the opposite end or from that end immersed in the molten bath and therefore maintains the exposed metal surface at the end of the tube clean by blowing away the slag and metal which would otherwise enter said end.

The light emanating from the exposed surface of the molten metal at the open end of the tube affects the resistance of the cell 24 which is electrically connected in circuit by conductors 26 with a battery 28 and galvanometer 30. Any variation in the resistance of the circuit is immediately recorded or indicated by the galvanometer 30 and as the selenium cell is very sensitive to variations in intensity of the light falling thereon accurate temperatures of the molten bath are indicated by the galvanometer upon proper calibration thereof.

As the device of the invention has an open end direct readings of the temperature of the metal bath as indicated by the light emanating therefrom can be obtained. The recording requires only a few seconds. The air under pressure admitted to the tube immediately exposes a clean surface and therefore accurate temperature readings are obtained. The short period required for taking a temperature reading conserves the life of the tube and further does not make necessary the use of expensive refractory materials for its protection. Although the tube is adequately protected against the high temperatures encountered within the furnace by means of the metal end 16 and insulating sleeve 18, the admission of air under pressure to the tube immediately functions to cool the same.

Although the insulated tube of Figure 2 is desirable where greater protection is needed the construction of Figure 3 has also operated in an entirely satisfactory manner for an extended period.

In Figure 4 a modified form of apparatus is shown which is designed for use with an optical instrument. Radiation pyrometers of the optical disappearing filament type and color value type have been used successfully with the form of apparatus disclosed. The tubular body 32 is of substantially the same diameter and length as the body member in the modification shown in Figure 1. Also the open end is insulated by the addition of an enlarged section 34 of refractory material, or the tubular body and end can be provided with heat protecting means as shown in Figure 2. The body 32 communicates with a supply tube or conduit 36 for supplying the same with air under pressure which escapes from the open end as in the structures previously described. In this modification the closed end is formed by a threaded member 38 having an opening 40 and which securely holds a glass disc 42 protected by the asbestos washers 44 adjacent the end of the tubular body. For preventing moisture condensation on the inside surface of the glass disc a protective tube 46 of metal is located in the closed end of the body and extends beyond the conduit 36, which admits air to the tubular body. The tube 46 is held in rigid position by member 38 and is aligned with the opening 40 in said member to provide a clear and unobstructed passage for the light given off by the molten metal presented to the open end of the tubular body when the same is immersed in a metal bath. The brightness or color of the metal exposed by the open end of the tubular body is recorded by an optical instrument 48 which is calibrated to indicate the temperature of the metal bath.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:
1. In a device for measuring the temperature of molten metal, in combination, a metal tube provided with heat protecting means on the exterior to protect the tube, said tube having an open end and a closed end, a light sensitive cell positioned in the closed end and electrically connected with a battery and galvanometer, said open end being adapted to be placed in the molten metal whereby the metal enters said open end and illuminates said cell with a light varying in intensity as the temperature of the metal varies, and means for admitting air under pressure to said cell to maintain the surface of the metal entering said open end clean and free from slag and other impurities.

2. Means for measuring the temperature of the metal bath in an open hearth furnace, comprising, a light sensitive cell, an elongated tubular enclosure for said cell having an open end and a closed end, said open end being adapted to be immersed in the metal bath, whereby the light emanating from the metal entering the open end causes a change in the electrical resistance of said cell, means electrically connecting with said cell for indicating said variations in resistance, and an air supply conduit communicating with the tubular enclosure for admitting air under pressure to the enclosure.

3. In a device for measuring the temperature of molten metals, in combination, a tubular body having an open end adapted to be immersed in the molten metal and a closed end, means adapted to maintain a clean surface on the metal presented to the open end when immersed, and means associated with the closed end and sensitive to the color or brightness of the light reaching said end for indicating the temperature of said metal.

4. In a device for measuring the temperature of molten metals, in combination, a tubular body having an open end adapted to be immersed in the molten metal and a closed end, means adapted to maintain a clean surface on the metal presented to the open end when immersed, said closed end of the tube having a window, and means adapted for association with said window for indicating the temperature of said metal.

5. In a device for measuring the temperature of molten metals, in combination, a tubular body having an open end adapted to be immersed in the molten metal and a closed end, a tube communicating with the body for admitting air under pressure thereto, whereby the metal presented to the open end is maintained clean and free from slag and other impurities, a window provided in the closed end, and means for association therewith to indicate the intensity of the light emanating from the surface of the metal presented by the open end of the tube.

6. In a device for measuring the temperature of molten metals, in combination, a tubular body having an open end adapted to be immersed in the molten metal and a closed end, a tube communicating with the body for admitting air under pressure thereto, whereby the metal presented to the open end is maintained clean and free from slag and other impurities, means for protecting the open end of the tube against the high temperatures to which the same is subjected, and means for association with the closed end to indicate the intensity in the brightness of the light reaching said end.

7. In a device for measuring the temperature of molten metals, in combination, a tubular body having an open end adapted to be immersed in the molten metal and a closed end, a tube communicating with the body for admitting air under pressure thereto, whereby the metal presented to the open end is maintained clean and free from slag and other impurities, means for protecting the open end of the tube against the high temperatures to which the same is subjected, and means for association with the closed end to indicate the color of the light reaching said end.

8. In a device for measuring the temperature of molten metals, in combination, a tubular body having an open end adapted to be immersed in the molten metal and a closed end, a tube communicating with the body for admitting air under pressure thereto, whereby the metal presented to the open end is maintained clean and free from slag and other impurities, means for insulating the exterior of the tube adjacent the open end, a window provided in the closed end, and an optical pyrometer associated with the window for indicating the intensity of the light reaching said end.

FRED L. COLLINS.
CARL OSELAND.